July 8, 1924.  1,500,905
E. THOMAS
GAS MIXING DEVICE
Filed Aug. 4, 1923
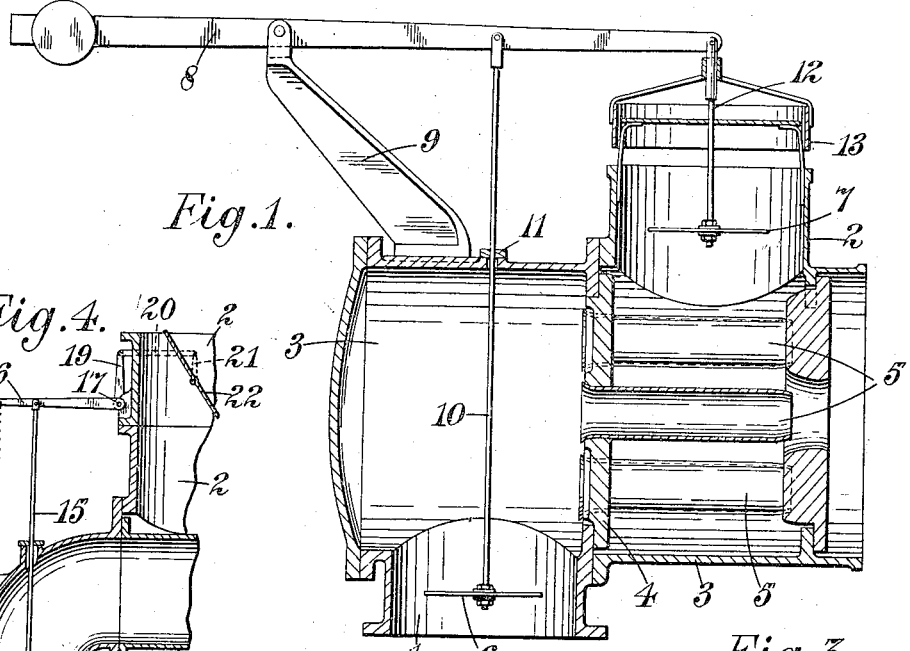
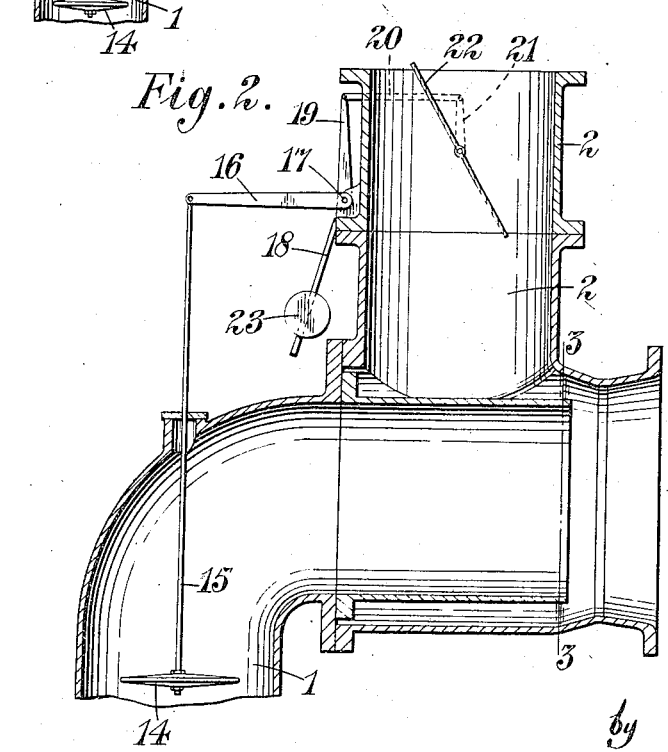
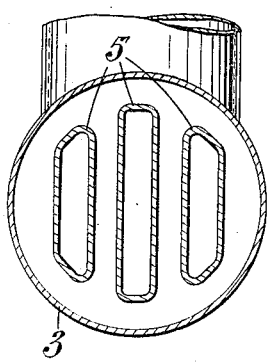
Inventor
Edgar Thomas
by Wilkinson & Giusta
Attorneys.

Patented July 8, 1924.

1,500,905

UNITED STATES PATENT OFFICE.

EDGAR THOMAS, OF JARROW-ON-TYNE, ENGLAND.

GAS-MIXING DEVICE.

Application filed August 4, 1923. Serial No. 655,731.

*To all whom it may concern:*

Be it known that I, EDGAR THOMAS, a subject of the King of England, residing at Jarrow-on-Tyne, in the county of Durham, England, have invented certain new and useful Improvements in Gas-Mixing Devices, of which the following is a specification.

This invention is for improvements in or relating to gas-mixing devices and is applicable to any apparatus such, for example, as gas-fuel burners, wherein two gases are to be mixed in definite proportions. The primary object of the invention is to provide means whereby the proper relative proportions of the two gases may automatically be kept substantially constant, throughout fluctuations in the flow of one or other of the two gases.

According to the present invention there is provided in a gas-mixing device wherein two gases are conveyed by two conduits to a point of admixture, flow-regulating means comprising a movable baffle located in one conduit and yieldingly held against the flow of gas therein, a valve controlling the flow of gas in the other conduit, and means so operatively connecting together said baffle and valve as to cause the movement of the baffle to operate the valve, for the purpose of automatically maintaining substantially constant the relative proportions of the two gases by increasing or decreasing the flow of gas through the valve in proportion to the increase or decrease respectively of the flow of gas past the baffle.

Preferably the valve, the yielding control of the baffle and/or the means operatively connecting the baffle with the valve are adjustable to vary the relative proportions of the two gases.

In certain applications of the invention, for example in gas-fuel burners, it is desirable that fluctuations in the flow of gas in either of the two conduits should be compensated for, and according to a further feature of this invention the said baffle may be yieldingly held against the flow of gas passing it by means of a second movable baffle located in said other conduit and so operatively connected to the first mentioned baffle that under the combined opposed action of the two flows of gas the baffles balance one another. Thus any excess of gas flowing through the valve will upset the balance of the baffles and will move them and operate the valve until the balance is restored.

In the accompanying drawings which illustrate by way of example forms of the invention as applied to a gas-fuel burner—

Figure 1 is a sectional elevation through a burner illustrating one form of the invention, Figure 2 is a sectional elevation through a burner illustrating another form of the invention, and Figure 3 is a transverse section through the burner on the line 3—3 of Figure 2, and Figure 4 shows a modification of the construction illustrated in Figure 2.

Referring first to Figure 1, the burner comprises two gas conduits 1 and 2 for gas and air respectively. The gas conduit 1 and the air conduit 2 both lead into a cylindrical chamber 3. A diaphragm 4 divides the chamber 3 into two portions and upon this diaphragm are mounted a series of gas nozzles 5 which project into the forward part of the chamber 3 and operate to project the gas fuel from the burner and induce a supply of air from the conduit 2 to support combustion. The gas is supplied under pressure and the air is induced partly by the injecting or aspirating effect of the nozzles and partly by chimney draught when the burner is applied to a furnace.

Located in the conduits 1 and 2 are disc-shaped baffles 6 and 7 which are suspended from two points of a counter-balance lever 8 pivotally mounted upon a support 9 secured to the top of the chamber 3. The disc 6 is suspended from the lever 8 by means of a rod 10 passing at 11 gas-tight through the chamber 3. The disc 7 is suspended from the lever 8 by means of a rod 12 which also carries a valve 13 controlling the air inlet 2.

The arrangement is such that when the required proportions of the two gases are flowing there is no movement of the discs, the upward pressure of the gas on the disc 6 counterbalancing the downward pressure of the air on the disc 7, but should the relative proportions vary for example by an excess of gas or a deficiency of air, caused say by a fluctuation in chimney draught, the two discs react upon one another and open or close the air valve 13 until the balance of the discs is restored.

Generally the desired ratio of air to gas will be about 0.7 to 1. The areas of the gas and air passages past the respective discs 6 and 7 are the same so that the volumes of gas and air will be exactly in proportion to their velocities past the discs. Assuming that the densities of the gas and air are equal the pressure on the discs will vary as the square of the velocity of the gas or air so that if the distances from the fulcrum of the lever 8 to the points of suspension of the rods 10 and 12 be in the ratio of $0.7^2$ to $1^2$, that is 0.49 to 1, the system will be in equilibrium when the correct proportions of the two gases are flowing.

Referring now to Figures 2 and 3, the construction of the burner proper is substantially the same as before. The flow regulating means, however, are such as to compensate only for fluctuation of flow in the gas conduit. They comprise a disc-shaped baffle 14 suspended by a rod 15 from an arm 16 of a lever pivotally mounted at 17 upon the air inlet 2. This lever is provided with three arms 16, 18 and 19. The arm 19 is pivotally connected by a link 20 with a lever 21 which operates a butterfly air valve 22. The arm 18 carries a counter-poise weight 23 which may be adjustable towards and away from the pivot 17.

An excess of gas will raise the disc 14 against the counter-poise weight 23 to operate the air valve 24 with the result that additional air will be introduced.

As an alternative to the counter-poise weight 23 the disc 14 may be yieldingly held against the flow of the gas by a spring 24, as illustrated in Figure 4.

A difference between the two constructions illustrated in Figures 1 and 2 is that in the former one not only is variation in the flow of gas compensated for but also variation in both chimney draught and the induction effect of the nozzles 5, whereas with the other construction and that shown in Figure 4 variation in chimney draught and nozzle induction effect is not compensated for.

It will be understood that the description above given is by way of example only and various modifications may be made within the scope of the invention.

What I claim as my invention and desire to secure by Letters Patent is:

1. In a fluid-mixing device, the combination with two conduits leading to a point of admixture of fluids conveyed through them, of flow-regulating means comprising a movable baffle located in one of said conduits, a second movable baffle located in the second of said conduits, a valve controlling the flow of fluid in the said second conduit and operatively connected to said second baffle, and means so operatively connecting the two baffles together that the forces operative on the baffles under the combined opposed action of the two currents of fluid balance one another, substantially as described.

2. In a governor device of the kind described, the combination of a casing member containing a mixing chamber, and two conduits leading to said chamber, of flow-regulating means comprising a movable baffle-member located in one of said conduits, a second movable baffle-member located in the second of said conduits, a lever fulcrumed on said casing member, and means so operatively connecting the baffle members each to said lever that the forces operative on the baffle members under the combined opposed action of the two currents in the conduits, balance one another, substantially as described.

3. In an air and gas mixing device, the combination of a casing member containing a mixing chamber, a gas conduit and an air conduit leading to said chamber, of a lever fulcrumed on said casing member, a valve operatively connected to said lever and arranged to control said air conduit, a baffle in said air conduit, a baffle in said gas conduit, and means so connecting said baffles to said lever that the forces operative on the baffles under the action of the flow of air and gas tend to rock the lever in opposite directions, substantially as described.

In testimony whereof I affix my signature.

EDGAR THOMAS.